Patented July 11, 1939

2,165,682

UNITED STATES PATENT OFFICE 2,165,682

METHOD OF MANUFACTURE OF CHLORINATED RUBBER OF HIGH APPARENT DENSITY

Raphael L. Stern, New Brunswick, N. J., assignor to Hercules Powder Company, Wilmington, Del., a corporation of Delaware No Drawing. Application September 30, 1937, Serial No. 166,704

3 Claims. (Cl. 260—111)

This invention relates to a method of making chlorinated rubber of high apparent density and the product thereof.

In the usual process of making chlorinated rubber, rubber is dissolved in carbon tetrachloride and chlorine is passed into the agitated solution, with and without air, until a sufficient degree of chlorination is obtained. The chlorinated derivative, so obtained, is then separated by evaporating the solution by contact with an agitated liquid, usually water, which is immiscible with the carbon tetrachloride and the solid product and which is maintained above the boiling point of the solvent. In this process, the chlorinated rubber has heretofore been precipitated at a temperature of approximately 180° F. which resulted in a quite fluffy and porous product having an apparent density after drying, in the case of high viscosity material, of only about 5 pounds per cubic foot.

For many purposes this fluffy, porous material is undesirable and it is an object of this invention to provide a method whereby a product of higher apparent density is obtained.

Now in accordance with this invention I have found that I may produce a good, granular product having an apparent density, when dry, of at least eight pounds per cubic foot and as high as fifteen pounds per cubic foot, by the simple expedient of keeping the temperature of the precipitating water at a temperature at or below about 175° F. but at or above about 158° F., preferably from about 165° F. to about 175° F., while agitating the water by suitable means.

The process in accordance with this invention is contemplated not only to involve the injection of the solution into agitated water at a temperature not less than about 158° F. nor above about 175° F., preferably from about 165° F. to about 175° F. by means of steam, but by any simple delivery tube, from the reaction vessel, held above the surface of the water, which is at a temperature above specified. Various vessels have been successfully used for the precipitation of chlorinated rubber according to my process, including a horizontal cylindrical closed tank fitted with a high speed mixer and an anchor type agitated kettle.

I have found that the temperature of the water in which the chlorinated rubber is to be precipitated should not be permitted to fall below a temperature of about 158° F. because if chlorinated rubber is precipitated below this temperature, it forms large hard masses which will stop or break the most powerful agitator. Precipitation above about 175° F. results in a low apparent density product which is not the object of this invention.

The mechanism of precipitation of a carbon tetrachloride solution of chlorinated rubber to obtain a low apparent density or a high apparent density product, depending on the temperature of the water in which the solution is precipitated, appears explicable along the following lines.

When a chlorinated rubber solution in carbon tetrachloride is dropped into hot, agitated water, the major portion of the carbon tetrachloride flashes off at once, since the constant boiling mixture of water-carbon tetrachloride boils at 151° F. When water at 180° F. or higher is used, evaporation is so rapid that practically all of the solvent is removed at once. Below this temperature, evaporation is slower and in the preferred temperature range, according to this invention, the initial flash does not remove all the carbon tetrachloride, but rather, a small amount remains behind, which serves to plasticize the precipitated particle at the temperature of precipitation, so that the expanded walls collapse of their own weight and thus shrink the particle and increase its apparent density. The solvent finally steam distills out of the particles, the last traces being removed by heating the precipitator water to about 203° F. If the initial temperature of precipitation is too low, so much solvent remains that the particles fuse together to give very large, hard lumps when solvent free.

As a specific example of the practical embodiment of my invention to show the improvement obtained by operating according to the procedure above described over that of the prior process, I took a chlorinated rubber-carbon tetrachloride solution from the reaction vessel and precipitated said solution by means of a steam jet in hot water maintained at the temperature shown in the following table. The apparent densities shown are those of the dried product.

| Sample No. | Viscosity in centipoises of a 20% by weight toluene solution of the precipitated chlorinated rubber | Apparent density in lbs. per cu. ft. | |
|---|---|---|---|
| | | Chlorinated rubber precipitated at 180° F. | Chlorinated rubber precipitated at 168° F. |
| 1 | 125 | 5.1 | 8.4 |
| 2 | 35 | 5.5 | 8.1 |
| 3 | 12 | 9.5 | 12.0 |

I have obtained chlorinated rubber with an apparent density as high as 15 pounds per cubic foot, when operating in my preferred temperature range, with the lower viscosity types of chlorinated rubber such as shown in Sample 3 above.

The increase in apparent density by injection of the chlorinated rubber-carbon tetrachloride solution into lower temperature water, according to my invention, is more than equal to that obtained when the chlorinated rubber, precipitated at 180° F. is pressed into blocks and ground, and furthermore my product has the advantage that it is less contaminated with iron, lead and other metals of construction and that dust losses, according to my method, are largely reduced. As a matter of fact, increased apparent density and less dusting, due to my procedure, enables me to dry all viscosity types of chlorinated rubber in a continuous screen drier, with 10% faster drying schedules than with the old process.

The product produced according to my invention is fully the equivalent of products made according to the prior process in solubility, stability, color, strength, film-forming properties, and processing qualities. I have found, for example, that my higher apparent density chlorinated rubber is equally as suitable as the lighter product for rapid re-solution in the production of varnishes, paints, lacquers, films or the like, but in addition my product has the advantage that the waste in handling, due to "dusting", is definitely less than that of the lighter product of the prior art. Furthermore greater quantities of my product can be put in a container of a given size which is an economy in both shipping and storing.

Where in the specification and claims I refer to the apparent density of chlorinated rubber, I mean apparent density as determined in the following manner: a 250 cc. graduated cylinder is filled with the dried chlorinated rubber and the said cylinder is then tapped 25 times on a large cork, placed on a table, from a height of about 2 to 3 inches, thus tamping down the charge. The volume V of the tamped material is then read and the contents of the cylinder weighed, giving the weight W. The apparent density, accurate within 5%, is calculated from the formula below:

$$\text{Apparent density (lbs. per cu. ft.)} = \frac{W}{V} \times 62.4$$

It will be understood that the examples given are by way of illustration only and that the scope of the invention is not limited thereto.

What I claim and desire to protect by Letters Patent is:

1. A method for the production of chlorinated rubber in the form of a precipitate of high apparent density which comprises precipitating a chlorinated rubber from a solution in carbon tetrachloride by introducing the said solution into agitated water maintained at a temperature not less than 158° F. and not greater than 175° F., thereby producing a chlorinated rubber in the form of discrete particles, having an apparent bulk density within the range of about 8 to about 15 pounds per cubic foot when dry.

2. A method for the production of chlorinated rubber in the form of a precipitate of high apparent density which comprises precipitating a chlorinated rubber from a solution in carbon tetrachloride by introducing the said solution by means of a jet of steam into agitated water maintained at a temperature not less than 158° F. and not greater than 175° F., thereby producing a chlorinated rubber in the form of discrete particles, having an apparent bulk density within the range of about 8 to about 15 pounds per cubic foot when dry.

3. A method for the production of chlorinated rubber in the form of a precipitate of high apparent density which comprises precipitating a chlorinated rubber from a solution in carbon tetrachloride by introducing the said solution by means of a jet of steam into agitated water maintained at a temperature not less than 165° F. and not greater than 175° F., thereby producing a chlorinated rubber in the form of discrete particles, having an apparent bulk density within the range of about 8 to about 15 pounds per cubic foot when dry.

RAPHAEL L. STERN.